US010020651B2

(12) United States Patent
Dickey

(10) Patent No.: US 10,020,651 B2
(45) Date of Patent: Jul. 10, 2018

(54) SYSTEMS AND METHODS FOR DISSIPATING TRANSIENT VOLTAGES IN ELECTRICAL SYSTEMS

(71) Applicant: Hamilton Sundstrand Corporation, Charlotte, NC (US)

(72) Inventor: John A. Dickey, Caledonia, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 432 days.

(21) Appl. No.: 14/933,707

(22) Filed: Nov. 5, 2015

(65) Prior Publication Data

US 2017/0085077 A1    Mar. 23, 2017

Related U.S. Application Data

(60) Provisional application No. 62/220,858, filed on Sep. 18, 2015.

(51) Int. Cl.
*H02H 3/22* (2006.01)
*H02H 9/00* (2006.01)

(52) U.S. Cl.
CPC .................. *H02H 9/005* (2013.01)

(58) Field of Classification Search
USPC .............................. 361/93.9, 91.5, 91.6, 111
See application file for complete search history.

(56) References Cited

U.S. PATENT DOCUMENTS

| 3,793,580 | A | * | 2/1974 | Baker | ........................ | G05F 1/58 |
| | | | | | | 323/271 |
| 4,110,809 | A | * | 8/1978 | Cronin | ..................... | H02H 3/08 |
| | | | | | | 361/95 |
| 5,488,533 | A | * | 1/1996 | Cassidy | .................... | H02H 3/20 |
| | | | | | | 361/18 |
| 5,804,859 | A | * | 9/1998 | Takahashi et al. | ..... | H01L 23/62 |
| | | | | | | 257/355 |
| 7,626,797 | B2 | | 12/2009 | Kilroy et al. | | |
| 7,741,883 | B2 | | 6/2010 | Fuller et al. | | |
| 8,547,675 | B2 | | 10/2013 | Maier | | |
| 8,847,656 | B1 | * | 9/2014 | A et al. | .................... | H03K 5/08 |
| | | | | | | 327/310 |
| 9,590,412 | B2 | * | 3/2017 | Poulose et al. | .......... | H02H 1/04 |
| 2002/0071231 | A1 | * | 6/2002 | Chloupek et al. | ........ | H02H 3/20 |
| | | | | | | 361/91.6 |
| 2003/0223170 | A1 | * | 12/2003 | Ely | .......................... | H02H 9/04 |
| | | | | | | 361/91.1 |
| 2007/0268726 | A1 | * | 11/2007 | Kojori et al. | ............. | H02J 1/10 |
| | | | | | | 363/65 |
| 2009/0289691 | A1 | * | 11/2009 | Fuller et al. | ........... | H03K 17/60 |
| | | | | | | 327/432 |
| 2012/0153963 | A1 | * | 6/2012 | Tyler | ...................... | G01R 31/02 |
| | | | | | | 324/537 |

* cited by examiner

*Primary Examiner* — Ronald W Leja
(74) *Attorney, Agent, or Firm* — Locke Lord LLP; Scott D. Wofsy; Christopher J. Cillié

(57) ABSTRACT

A solid-state power controller (SSPC) includes two or more SSPC channels for connecting a load to a feed bus. The SSPC channels include a disconnect switch and an enable switch having a terminal connected to a gate of the disconnect switch. A voltage clamping diode of the SSPC channel is connected to the gate of the enable switch, and is arranged to close the enable switch when a transient voltage applied to the SSPC channel when the transient voltage exceeds the breakdown voltage of the voltage clamping diode.

15 Claims, 4 Drawing Sheets

SYSTEMS AND METHODS FOR DISSIPATING TRANSIENT VOLTAGES IN ELECTRICAL SYSTEMS

RELATED APPLICATIONS

This application claims the benefit under 35 U.S.C. § 119(e) of U.S. Provisional Patent Application No. 62/220,858 filed on Sep. 18, 2015, the entire contents of which is incorporated herein by reference in its entirety.

BACKGROUND OF THE INVENTION

1. Field of the Invention

The present disclosure relates to electrical systems, and more particularly to dissipating transient voltages through solid-state power converter channels.

2. Description of Related Art

Electrical systems, such as aircraft electrical systems, commonly employ solid-state power controllers that selectively apply line voltage to loads powered by the electrical system. The solid-state power controllers typically include one or more power MOSFETs which switch line voltage to the load by switching between on and off states according to a command signals applied to the power MOSFETs. Some power MOSFETs, when exposed in the off-state to voltage transients that are greater than the voltage rating of the power MOSFET, can break down and begin to conduct without being commanded into the on-state. In extreme circumstances, such as when the voltage transient is associated with a lightening strike, power MOSFETs may experience voltage transients of magnitude sufficient to damage or destroy the power MOSFET devices. For that reason, some solid-state power controllers employ transient voltage dissipation devices to dissipate the energy associated with voltage transients and prevent power MOSFETs of the controller from being forced into an on-state or being damaged or destroyed.

Such conventional methods and systems have generally been considered satisfactory for their intended purpose. However, there is still a need in the art for improved systems and methods for managing voltage transients in electrical systems. The present disclosure provides a solution for this need.

SUMMARY OF THE INVENTION

A solid-state power controller (SSPC) includes two or more SSPC channel for connecting a load to a feed bus. The respective SSPC channels include a disconnect switch and an enable switch with a terminal connected to a gate of the disconnect switch. A channel voltage clamping diode is connected to the gate of the enable switch and is arranged to close the enable switch when a transient voltage applied to the SSPC channel exceeds the breakdown voltage of the voltage clamping diode.

In embodiments, the SSPC group can include a load-side protection clamping bus connected to the gate of the disconnect switch of the SSPC channel. A load-side voltage clamping diode can be connected to the gate of the disconnect switch of the SSPC channel. The load-side voltage clamping diode can have a breakdown voltage that is greater the breakdown voltage of the channel voltage clamping diode. The SSPC group can also have a collection bus connected to the load-side protection clamping bus by the load-side voltage clamping diode.

In accordance with certain embodiments, the SSPC group can include a feed-side protection clamping bus connected to the gate of the SSPC channel disconnect switch. A feed-side voltage clamping diode can be connected to the gate of the disconnect switch of the SSPC channel. It is contemplated that one or more of the channel voltage clamping diode, the load-side voltage clamping diode, or the feed-side voltage protection diode can be transient voltage suppression diode devices, transorb devices, and/or Zener diodes.

It is also contemplated that, in accordance with certain embodiments, the two or more SSPC channels can include at least a first SSPC channel that is connected in parallel with a second SSPC channel between a feed bus and a load. The load-side protection clamping bus can be connected through respective enable switches to gates of the disconnect switches of both the first and second SSPC channels. Connection can be through enable switches of the first and second SSPC channels. A single load-side voltage clamping diode can be connected to the gates of the disconnect switches of both the first and second SSPC channels, such as through the protection clamping bus and the respective SSPC channel enable switch. The voltage clamping diode of the first SSPC channel can have a breakdown voltage that is different than that of the voltage clamping diode of the second SSPC channel, such as within the tolerances of the diodes. The feed-side voltage clamping diode can be connected to the gates of the disconnect switches of the first and second SSPC channels, such as through the feed-side protection clamping bus.

A method of dissipating a voltage transient includes receiving a voltage transient at a load coupled to a feed bus by two more parallel SSPC channels, enabling the SSPC channels using the voltage transient, connecting the load to the feed bus using the voltage transient, and dissipating the voltage transient by applying the voltage transient to the feed bus through the SSPC channels. In embodiments, the SSPC channels are both enabled prior to connecting the load to the feed bus.

A method of dissipating a voltage transient includes receiving a voltage transient at a load coupled to a feed bus by two or more parallel SSPC channels, enabling a first of the parallel SSPC channels using the voltage transient, enabling a second of the parallel SSPC channels using the voltage transient after enabling the first of the parallel SSPC channels, simultaneously connecting the load to the feed bus using the voltage transient, and dissipating the voltage transient by applying the voltage transient to the feed bus through both the SSPC channels.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
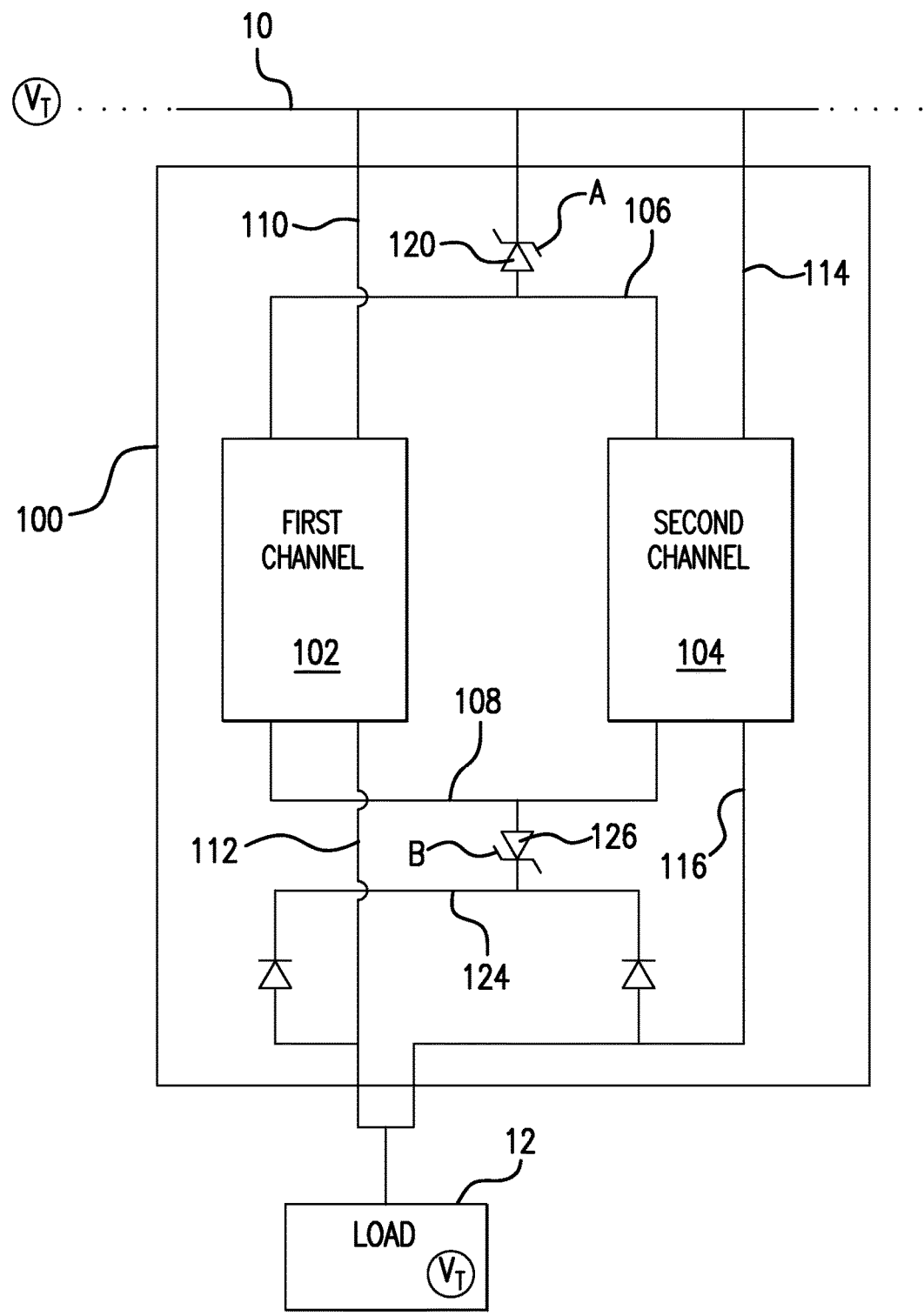
FIG. 1 is schematic view solid-state power controller (SSPC) group, showing the SSPC group connecting a load to a feed bus through parallel SSPC channels.

Reference will now be made to the drawings wherein like reference numerals identify similar structural features or aspects of the subject disclosure. For purposes of explanation and illustration, and not limitation, a partial view of an exemplary embodiment of a solid-state power controller (SSPC) group in accordance with the disclosure is shown in FIG. 1 and is designated generally by reference character 100. Other embodiments of SSPC devices, or aspects thereof, are provided in FIGS. 2-4, as will be described. The systems and methods described herein can be used in electrical systems to dissipate transient voltages in electrical systems, such as in lightning protection for parallel fed loads in aircraft electrical systems.

Referring to FIG. 1, SSPC group 100 is shown. SSPC group 100 includes a first SSPC channel 102, a second SSPC channel 104, a feed-side protection clamping bus 106, and a load-side protection clamping bus 108. First SSPC channel 102 includes a feed lead 110 and load lead 112. Feed lead 110 connects first SSPC channel 102 to a feed bus 10. Load lead 112 connects first SSPC channel to a load 12. Second SSPC channel 104 includes a feed lead 114 and load lead 116. Feed lead 114 connects second SSPC channel 104 to a feed bus 10. Load lead 116 connects first SSPC channel to a load 12. First SSPC channel 102 and second SSPC channel 104 are both configured to provide alternating current (AC) power from feed bus 10 to load 12 in a parallel arrangement through automated control of disconnect switches (shown in FIG. 2) disposed within SSPC group 100, current to time trip curve protection, and/or transient voltage dissipation from either feed bus 10 to load 12 or from load 12 to feed bus 10. Although illustrated as a dual fed load, it is to be appreciated and understood that embodiments of the SSPC described herein suppling loads through a single channel or through more than two channels, are as suitable for an intended application.

SSPC group 100 also includes a feed-side protection clamping bus 106, a feed-side voltage clamping diode 120, a load-side protection clamping bus 108, a load-side collection bus 124, and a load-side voltage clamping diode 126. Feed-side protection clamping bus 106 interconnects disconnect switches (shown in FIG. 2) of first SSPC channel 102 and second SSPC channel 104 with feed-side voltage clamping diode 120. Feed-side voltage clamping diode 120 connects feed-side protection clamping bus 106 with feed bus 10 and is arranged to oppose current flow from feed bus 10 to feed-side protection clamping bus 106. In this respect the cathode of feed-side voltage clamping diode 120 is connected to feed bus 10 and the anode of feed-side voltage clamping diode 120 is connected to feed-side protection clamping bus 106.

Load-side protection clamping bus 108 interconnects enable switches (shown in FIG. 2) of first SSPC channel 102 and second SSPC channel 104 with load-side voltage clamping diode 126. Load-side voltage clamping diode 126 connects load-side protection clamping bus 108 with collection bus 124, and is arranged to oppose current flow from collection bus 124 to load-side protection clamping bus 108. In this respect the anode of load-side voltage clamping diode 126 is connected to load-side protection clamping bus 108 and the cathode of load-side voltage clamping diode 126 is connected to collection bus 124. Collection bus 124 in turn is connected to load 12 through load lead diodes that are each arranged to oppose current flow to the channel load leads, i.e. first channel load lead 112 and second channel load lead 116, from collection bus 124.

Feed-side voltage clamping diode 120 has a breakdown or avalanche voltage A that is larger than the voltage normally provided by feed bus 10. When the voltage potential on feed bus 10 exceeds breakdown or avalanche voltage A, such as the result of a voltage rise on feed bus 10 associated with a transient voltage event $V_T$, e.g., a lightning strike on a device connected to feed bus 10, feed-side voltage clamping diode 120 applies the voltage to disconnect switches (shown in FIG. 2) of both first SSPC channel 102 and second SSPC channel 104 via feed-side protection clamping bus 106.

Load-side voltage clamping diode 126 has a breakdown or avalanche voltage B that is larger than the voltage normally provided by load lead 112 of first SSPC channel 102 and load lead 116 of second SSPC channel 104. When the voltage potential thereon exceeds breakdown or avalanche voltage B, such as the result of a voltage rise on load 12 associated with a transient voltage event $V_T$, load-side voltage clamping diode 126 applies the voltage to enable switches (shown in FIG. 2) of both first SSPC channel 102 and second SSPC channel 104 via load-side protection clamping bus 108. In the illustrated exemplary embodiment one or more of feed-side voltage clamping diode 120, load-side voltage clamping diode 126, and channel voltage clamping diode 134 (shown in FIG. 2) are Zener diodes. In certain embodiments, one or more of feed-side voltage clamping diode 120, load-side voltage clamping diode 126, and channel voltage clamping diode 134 (shown in FIG. 2) may be transient voltage suppression diodes or transorb devices, such as Tranzorb® devices available from Vishay General Semiconductor, LLC of Malvern, Pa.

Figure 2:
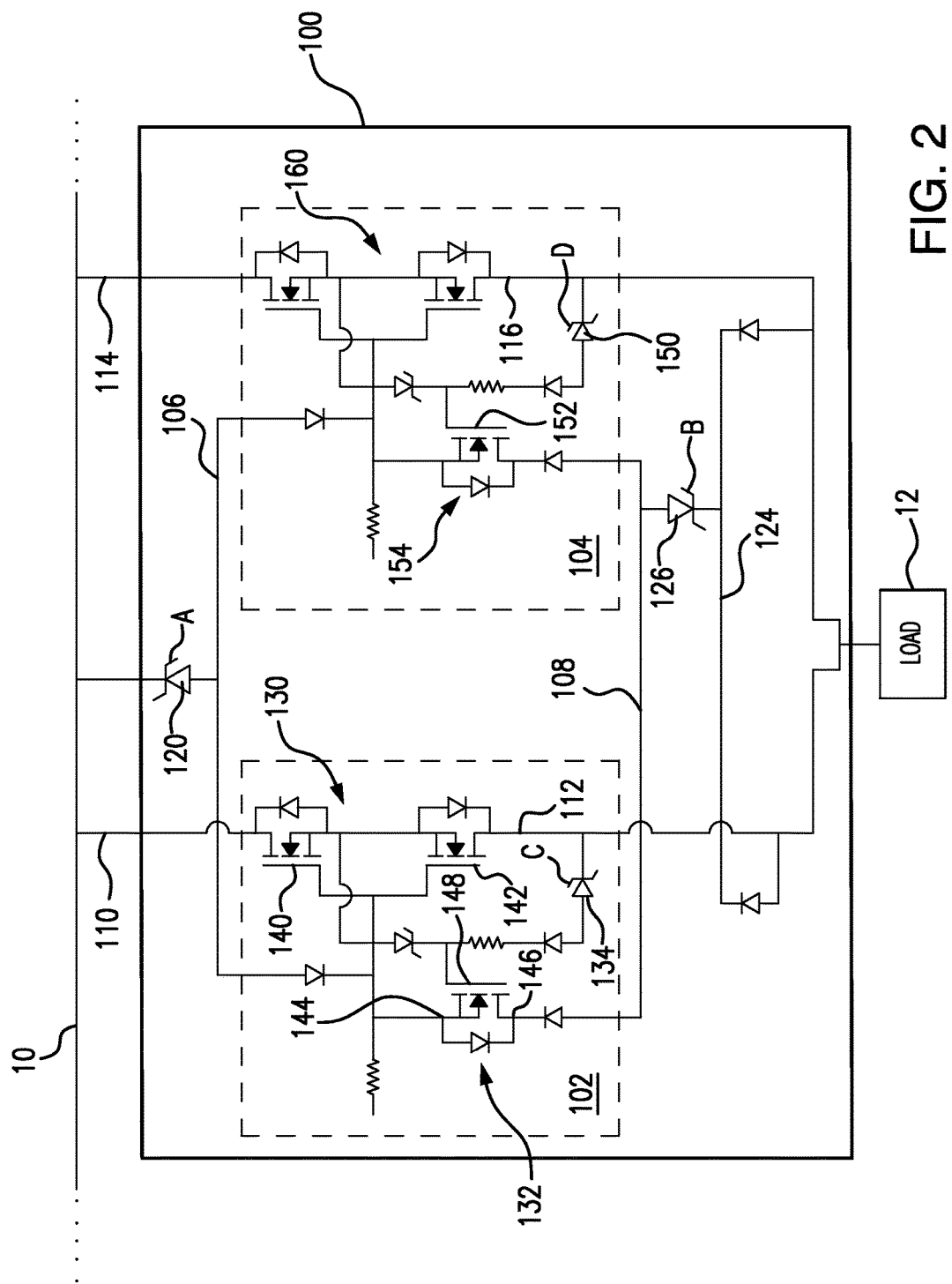
FIG. 2 is a circuit diagram of the SSPC group of FIG. 1, showing gating switches of each SSPC channel operably connected to SSPC channel leads through voltage clamping diodes.

Referring now to FIG. 2, circuit diagrams of first SSPC channel 102 and second SSPC channel 104 of SSPC group 100 are shown. First SSPC channel 102 includes a disconnect switch 130, an enable switch 132, and a channel voltage clamping diode 134. Disconnect switch 130 is configured for providing AC power to load 12, and in this respect includes a pair of solid-state switch that are connected at their source terminals. In the illustrated exemplary embodiments, the pair of solid-state switch devices are MOSFET devices having a gate 140 and a gate 142 that are configured to increase conductivity through disconnect switch 130 according to voltage applied thereto. Gate 140 and gate 142 of disconnect switch 130 are both connected to a source terminal 144 of enable switch 132.

Enable switch 132 of first SSPC channel 102 has a drain terminal 146 and a gate 148. Drain terminal 146 of enable switch 132 is connected to load-side protection clamping bus 108, and therethrough to the anode of load-side voltage clamping diode 126. Gate 148 of enable switch 132 is connected to channel voltage clamping diode 134, and more specifically to the anode of channel voltage clamping diode 134. A cathode of channel voltage clamping diode 134 is connected to load lead 116, and therethrough to load 12.

Channel voltage clamping diode 134 has an avalanche or breakdown voltage C. As will be appreciated by those of skill in the art in view of the present disclosure, when voltage on load lead 112 exceeds avalanche of breakdown voltage C, channel voltage clamping diode 134 begins to conduct. Accordingly, when load 12 experiences a transient voltage rise that exceeds avalanche or breakdown voltage C during a transient voltage event, such as lightning strike for purposes of example and not for limitation, channel voltage clamping diode 134 applies a voltage to gate 148 of enable switch 132. The voltage causes enable switch 132 to close and electrically connect source terminal 144 with drain terminal 146 of enable switch 132. Closure of enable switch 132 in turn electrically connects the anode of load-side voltage clamping diode 126 with gate 140 and gate 142 of the solid-state switch devices of disconnect switch 130, enabling connection of feed lead 110 with load lead 112 upon application of voltage by load-side voltage clamping diode 126.

Avalanche or breakdown voltage C of channel voltage clamping diode 134 is lower than avalanche or breakdown voltage B of load-side voltage clamping diode 126. As result, when load 12 experiences a voltage rise during a transient voltage event and applies the rising voltage to both channel voltage clamping diode 134 and load-side voltage clamping diode 126, channel voltage clamping diode 134 reaches its avalanche or breakdown voltage prior to load-side voltage clamping diode 126 reaching its avalanche or breakdown voltage. This causes channel voltage clamping diode 134 to close enable switch 132 prior to load-side voltage clamping diode 126 applying voltage to drain terminal 146 of enable switch 132. In the event that the voltage transient rises thereafter to a level where it exceeds avalanche or breakdown voltage B, then load-side voltage clamping diode 126 applies the voltage to gate 140 and gate 142 of disconnect switch 130 through enable switch 132. This connects load 12 with feed bus 10, and allows the voltage transient to be applied to feed bus 10, and be dissipated thereby.

Second SSPC channel 104 is similar to first SSPC channel 102. In this respect a channel voltage clamping diode 150 of second SSPC channel 104 has an avalanche or breakdown voltage D. Avalanche or breakdown voltage D of channel voltage clamping diode 150 is also less than avalanche or breakdown voltage B of load-side voltage clamping diode 126. Thus, as with channel voltage clamping diode 134 of first SSPC channel 102, channel voltage clamping diode 150 applies voltage to gate 152 of enable switch 154 prior to load-side voltage clamping diode 126 reaching its avalanche or breakdown voltage. As a consequence, at the moment that load-side voltage clamping diode 126 reaches avalanche or breakdown voltage B, both enable switch 132 of first SSPC channel 102 and enable switch 154 are electrically closed, voltage is applied therethrough to the gates of disconnect switch 130 of first SSPC channel 102 and gates of a disconnect switch 160 of second SSPC channel 104 at the same time. This causes the transient voltage in load 12 to be dissipated in a balanced manner between first SSPC channel 102 and second SSPC channel 104 because the disconnect switches connecting the respective feed leads and load leads close at the same time, minimizing the voltage stress exerted of both SSPC channels by the voltage transient.

With continuing reference to FIG. 2, single feed-side voltage clamping diode 120 and feed-side protection clamping bus 106 enable balanced dissipation of transient voltages on feed bus 10. In this respect, when disconnect switch 130 of first SSPC channel 102 and disconnect switch 160 of second SSPC channel 104 are open, and a voltage transient on feed bus 10 rises to above avalanche or breakdown voltage A of feed-side voltage clamping diode 120, feed-side protection clamping bus 106 applies the voltage simultaneously to gates of disconnect switch 130 of first SSPC channel 102 and gates of disconnect switch 160 of second SSPC channel 104. The simultaneously applied voltage causes both disconnect switch 130 and disconnect switch 160 to simultaneously close. Simultaneous closure of disconnect switch 130 of first SSPC channel 102 and disconnect switch 160 of second SSPC channel 104 provides balanced dissipation of the transient voltage through both first SSPC channel 102 and second SSPC channel 104 the respective feed and load leads of the SSPC channels.

Figure 3:
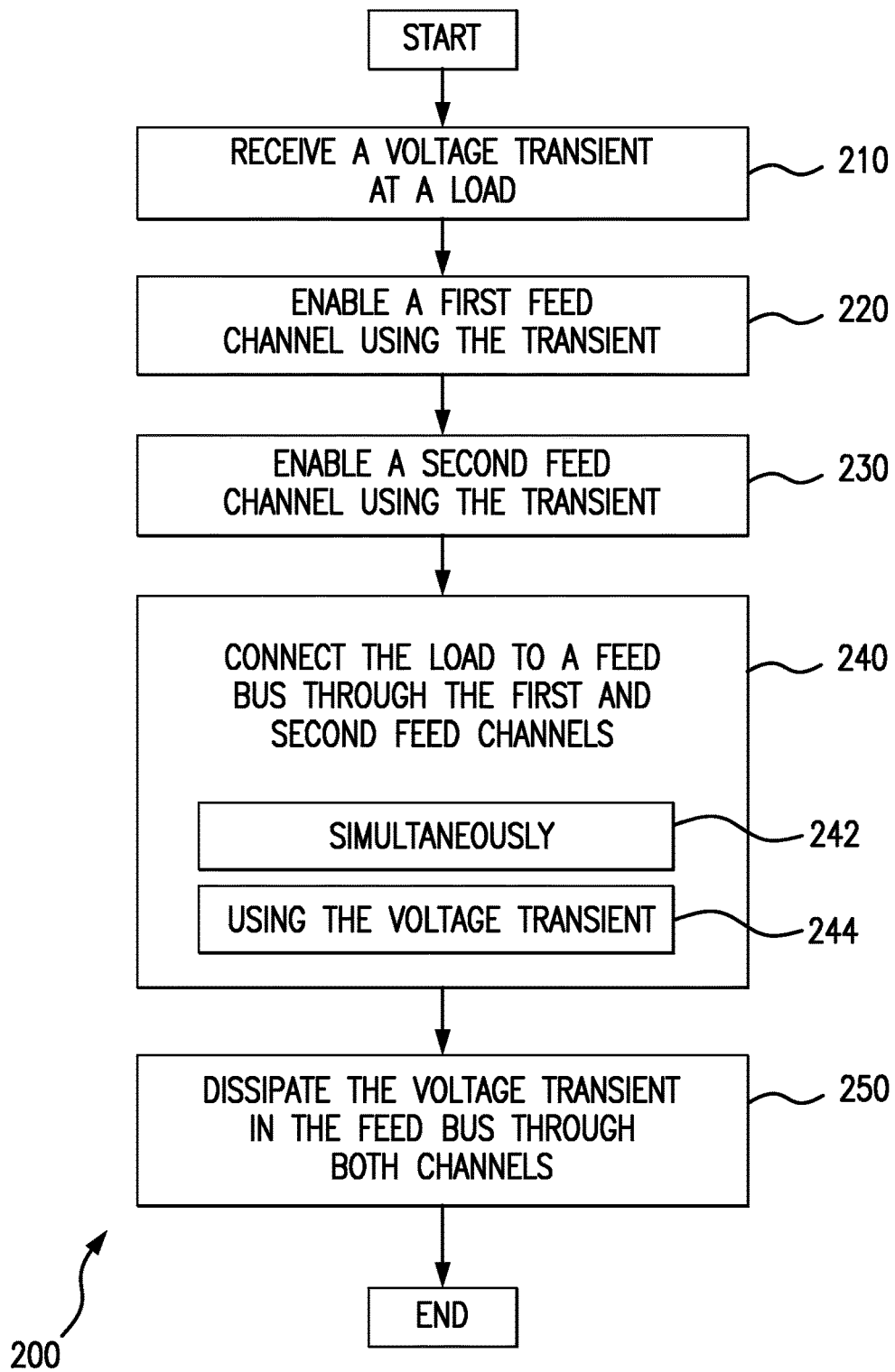
FIG. 3 shows a method of dissipating negative feed transient voltages (or positive load side) transient voltages through parallel SSPC channels of an SSPC group.

With reference to FIG. 3, a method of dissipating a positive load-side transient voltage in a load through parallel SSPC channels of an SSPC group, e.g., SSPC group 100 (shown in FIG. 1), is generally indicated by reference numeral 200. Method 300 includes receiving a positive transient voltage at a load, e.g., load 12 (shown in FIG. 1), as shown with box 210. Using the transient voltage, a first SSPC channel is enabled, e.g., first SSPC channel 102 (shown in FIG. 1), as shown with box 220. Enabling can be by applying voltage to the gate of an enable switch, e.g. enable switch 132 (shown in FIG. 2). Using the transient voltage, a second SSPC channel is enabled, e.g., second SSPC channel 104 (shown in FIG. 1), as shown with box 230. It is contemplated that the first and second SSPC channels are enabled sequentially (i.e. enable switch 132 and enable switch 154 as shown FIG. 2), such as according to the differences in the avalanche or breakdown voltage of the respective channel voltage clamping diode, e.g., channel voltage clamping diode 134 (shown in FIG. 2) and channel voltage clamping diode 150 (shown in FIG. 2).

Once the first and second channels have been enabled the load experiencing the transient voltage rise is connected to the feed bus through the first and second SSPC channels, as shown with box 240. The connection is made using the voltage transient, i.e. by the voltage transient exceeding the avalanche or breakdown voltage of a feed-side diode, e.g., load-side voltage clamping diode 126 (shown in FIG. 2), as shown with box 244. It is contemplated that the connection be made simultaneously, as shown with box 242, simultaneously meaning in certain contemplated embodiments within the switching speed of the channel disconnect switches rather being governed by the breakdown time and avalanche or breakdown voltage for two diodes. Once the connection is made the voltage transient is dissipated in the feed bus and through the first and second SSPC channels.

Figure 4:
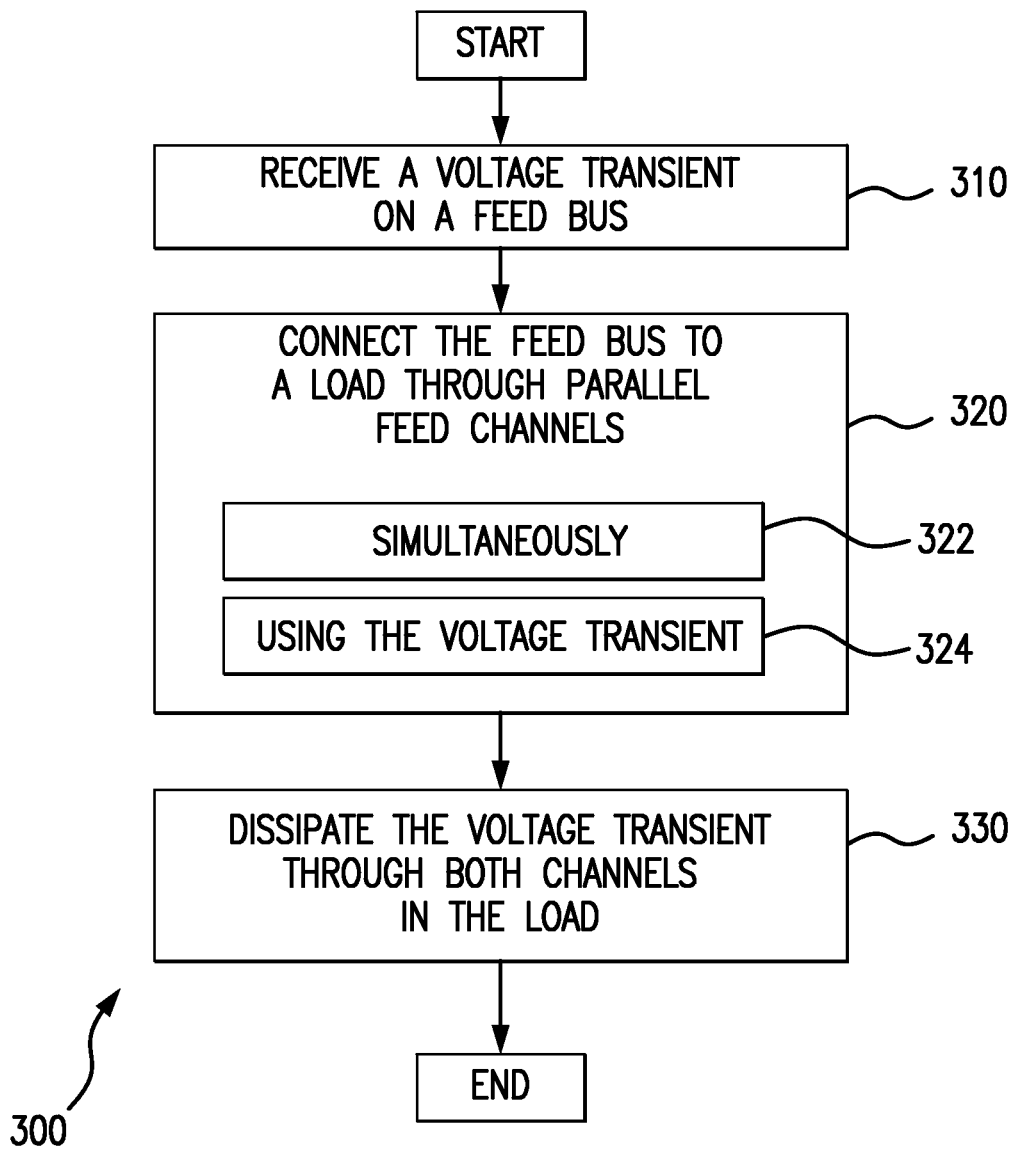
FIG. 4 shows a method of dissipating positive feed transient voltages (or a negative load side) transient voltages through parallel SSPC channels of an SSPC group.

With reference to FIG. 4, a method of dissipating a positive feed-side transient voltage in a load through parallel SSPC channels of an SSPC is generally indicated by reference numeral 300. Method 300 includes receiving a positive voltage transient on a feed, e.g., voltage transient $V_T$ (shown in FIG. 1) on feed bus 10 (shown in FIG. 1), as shown with box 310. When the voltage transient exceeds an avalanche or breakdown voltage of a feed-side voltage clamping diode, e.g., avalanche or breakdown voltage A of feed-side voltage clamping diode 120 (shown in FIG. 1), the feed bus with the rising transient voltage is connected to a load, e.g., load 12 (shown in FIG. 1), through SSPC channels of an SSPC group, e.g., first SSPC channel 102 (shown in FIG. 1) and second SSPC channel 104 (shown in FIG. 1), as shown with box 320.

Connection of the feed bus with the load may be through simultaneous application of the transient voltage to disconnect switches of the SSPC channels, e.g., disconnect switch 130 (shown in FIG. 2) and disconnect switch 160 (shown in FIG. 2), as shown with box 322. Connection of the feed bus with the load may be through use of the voltage transient, such as by applying the voltage transient to gates of the disconnect switches to cause the disconnect switch to close, as shown with box 324. The voltage transient thereafter dissipates in the load through both SSPC channels, as shown with box 330.

The methods and systems of the present disclosure, as described above and shown in the drawings, provide for transient dissipation devices with superior properties including balanced sharing of energy associated during transient events among electrical devices connected to the transient voltage circuit and in parallel with one another. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A solid-state power controller (SSPC) group, comprising:
    two or more SSPC channels, both including:
        a disconnect switch;
        an enable switch with a terminal connected to a gate of the disconnect switch; and
        a voltage clamping diode connected to a gate of the enable switch, wherein the voltage clamping diode is arranged to close the enable switch when a transient voltage applied to the SSPC channel that exceeds a breakdown voltage of the voltage clamping diode, whereby the enable switch closes the disconnect switch.

2. An SSPC group as recited in claim 1, further including a load-side protection clamping bus connected to the gate of the disconnect switch of the SSPC channel through the enable switch of the SSPC channel.

3. An SSPC group as recited in claim 1, further including a load-side voltage clamping diode connected to the gate of the SSPC channel disconnect switch of the SSPC channel through a load-side protection clamping bus and the enable switch of the SSPC channel.

4. An SSPC group as recited in claim 3, wherein the load-side voltage clamping diode has a breakdown voltage that is greater the breakdown voltage of the voltage clamping diode of the SSPC channel.

5. An SSPC group as recited in claim 1, further including a feed-side protection clamping bus connected to the gate of the disconnect switch of the SSPC channel.

6. An SSPC group as recited in claim 1, further including a feed-side voltage clamping diode connected to the gate of the disconnect switch of the SSPC channel.

7. An SSPC group as recited in claim 1, wherein the two or more SSPC channels include a first SSPC channel and a second SSPC channel, wherein the first SSPC channel is connected in parallel with the second SSPC channel between a feed bus and a load.

8. An SSPC group as recited in claim 7, further including a load-side protection clamping bus connected to the gates of the disconnect switches of the first and second SSPC channels.

9. An SSPC group as recited in claim 7, further including a single load-side voltage clamping diode connected to gates of the disconnect switches of the first and second SSPC channels.

10. An SSPC group as recited in claim 9, wherein the load-side voltage clamping diode has a breakdown voltage that is greater the breakdown voltages of the voltage clamping diodes of the first and second SSPC channels.

11. An SSPC group as recited in claim 10, wherein the voltage clamping diode of the first SSPC channel has a breakdown voltage that is different than a breakdown voltage of the voltage clamping diode of the second SSPC channel.

12. An SSPC group as recited in claim 7, further including a feed-side voltage clamping diode connected to the gates of the disconnect switches of the first and second SSPC channels.

13. An SSPC group as recited in claim 1, wherein the voltage clamping diode is a transient voltage suppression diode, a transorb, or a Zener diode.

14. A method of dissipating a voltage transient, comprising:
    receiving a voltage transient at a load coupled to a feed bus by an SSPC channel;
    enabling the SSPC channel using the voltage transient;
    connecting the load to the feed bus using the voltage transient; and
    dissipating the voltage transient by applying the voltage transient to the feed bus through the SSPC channel.

15. A method of dissipating a voltage transient, comprising:
    receiving a voltage transient at a load coupled to a feed bus by parallel SSPC channels;
    enabling a first of the parallel SSPC channels using the voltage transient;
    enabling a second of the parallel SSPC channels using the voltage transient after enabling the first of the parallel SSPC channels;
    simultaneously connecting the load to the feed bus using the voltage transient; and
    dissipating the voltage transient by applying the voltage transient to the feed bus through both the parallel SSPC channels.

* * * * *